United States Patent [19]

Fujio

[11] 4,016,704
[45] Apr. 12, 1977

[54] METHOD AND APPARATUS FOR ENCAPSULATING CONTAINER WITH TUBULAR WRAPPING MEMBER

[76] Inventor: Masaaki Fujio, 8, 3-15 Aoyamadai, Suita, Osaka, Japan

[22] Filed: July 2, 1975

[21] Appl. No.: 592,528

[52] U.S. Cl. .................................... 53/3; 53/305; 53/198 R; 53/292; 53/296; 156/86; 156/521
[51] Int. Cl.² .................. B65B 9/00; B65B 53/00; B65B 61/00
[58] Field of Search ............... 53/3, 29, 30 R, 30 S, 53/198 R, 183, 184 R, 184 S, 291, 292, 295, 296, 298; 156/86, 264, 294, 521

[56] References Cited

UNITED STATES PATENTS

| | | | |
|---|---|---|---|
| 2,660,353 | 11/1953 | Gampp | 53/292 |
| 2,846,835 | 8/1958 | Aguilar et al. | 53/291 |
| 3,551,258 | 12/1970 | Galvanoni et al. | 53/291 X |
| 3,738,210 | 6/1973 | Fujio | 53/291 X |
| 3,888,067 | 6/1975 | Cross et al. | 53/296 X |

Primary Examiner—Robert Louis Spruill
Attorney, Agent, or Firm—Lackenbach, Lilling & Siegel

[57] ABSTRACT

A method and apparatus for encapsulating a container with a tubular wrapping member. The tubular wrapping member is dilated by a suction unit and fed onto one end of a guide member which is aligned with the container to be encapsulated and which is held at a lifted position by chucks. After disengaging the chucks from the guide member, an engaging means is caused to engage with the guide member and move along the axis of the guide member from one end toward another end thereof for thereby transferring the tubular wrapping member onto the container to be encapsulated.

10 Claims, 3 Drawing Figures

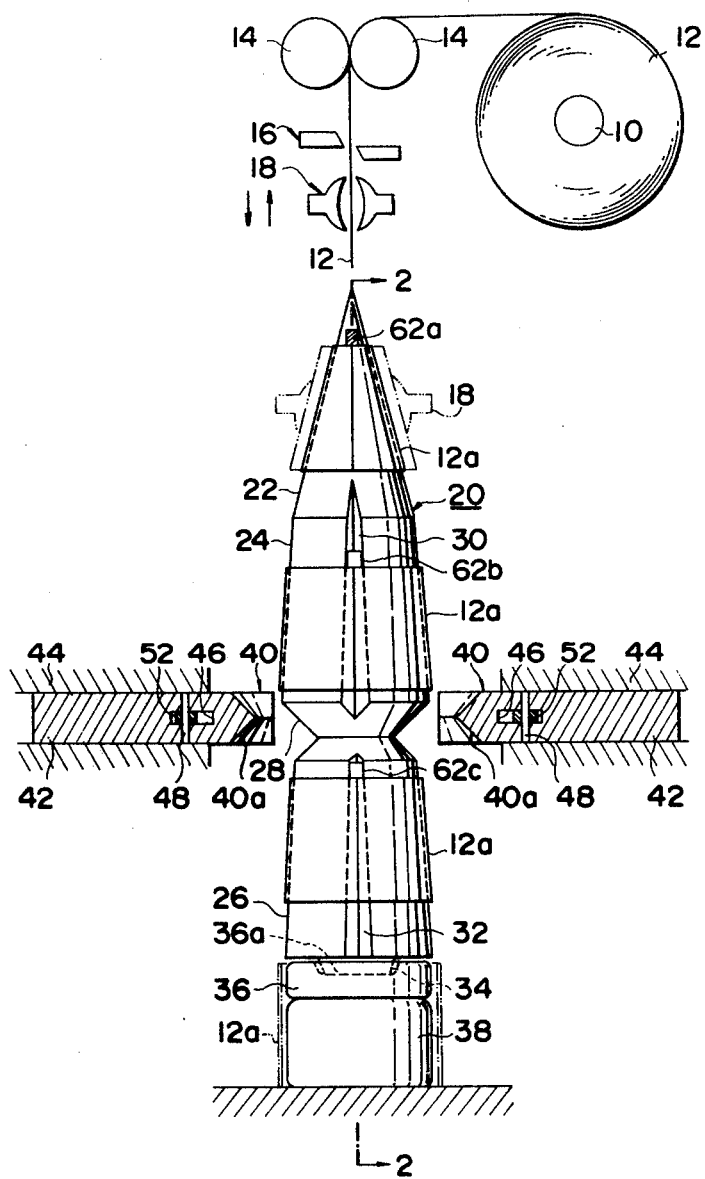

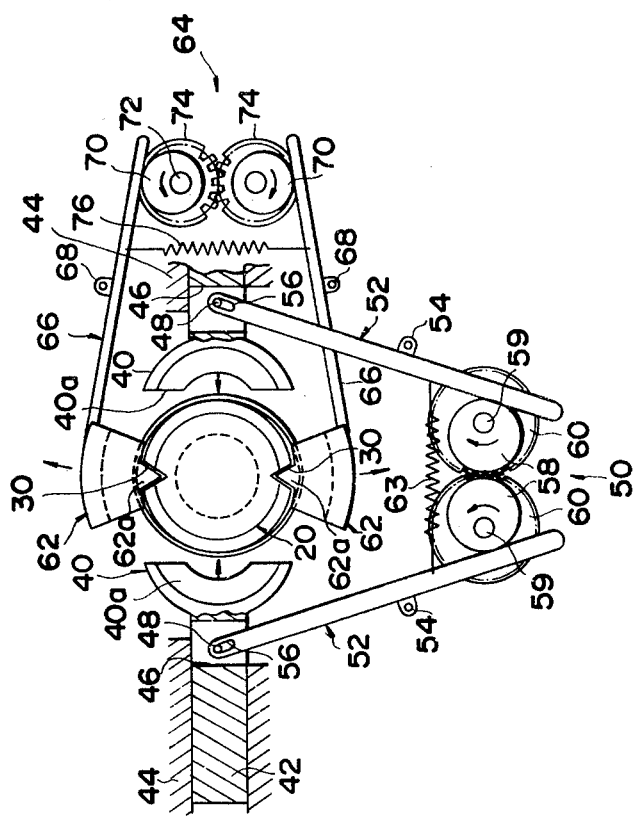

METHOD AND APPARATUS FOR ENCAPSULATING CONTAINER WITH TUBULAR WRAPPING MEMBER

This invention relates to a method and apparatus for encapsulating a container with a tubular wrapping sheet or member.

As is well known, it has heretofore been proposed to encapsulate a container with a wrapping member with a view to protecting the container against shocks and preventing the scattering of glass, plastic, etc., even when the container is broken. The wrapping member is usually shaped in tubular form and wound on a reel in folded condition before encapsulating operation. During encapsulating operation, the folded wrapping member is initially dilated or expanded into a cylindrical shape so that the wrapping member can be easily delivered onto the container to cover the outer periphery of the container. In this instance, the expanded wrapping member is delivered onto the container in a continuous state and the wrapping member is cut after the same has been put on the container. A difficulty is encountered in this prior art method in that it is difficult to encapsulate the container at high speed and in simple fashion.

It is, therefore, an object of the present invention to provide an improved method for encapsulating a container with a tubular wrapping member.

It is another object of the present invention to provide an apparatus for encapsulating a container with a tubular wrapping member at high speed.

It is another object of the present invention to provide an apparatus for encapsulating a container with a tubular wrapping sheet or member which is simple in construction and easy to manufacture.

It is still another object of the present invention to provide an apparatus which is capable of encapsulating a container having various sizes and shapes.

These and other objects, features and advantages of the present invention will become more apparent from the following description when taken in conjunction with the accompanying drawings, in which:

FIG. 1 is a schematic view of a preferred embodiment of an apparatus partly in cross section, for carrying out a method of the present invention;

FIG. 2 is a cross section taken along a line 2—2 of FIG. 1; and

FIG. 3 is a schematic view illustrating examples of actuating means forming part of the present invention.

Before entering into detail description of the present invention, it should be noted that, while the wordings "upward", "downward", "vertically", etc., have been frequently used in the specification for the sake of simplicity of description, the present invention is not limited by these wordings.

Referring now to FIG. 1, there is schematically shown a preferred embodiment of an apparatus for carrying out the present invention. As shown, the apparatus includes a rotatably mounted reel 10, on which a tubular wrapping member 12 is wound in a folded or substantially flat condition. The wrapping member 12 may be of a heat-shrinkable synthetic resin which is capable of shrinking tightly about a container when subjected to heat. The wrapping member 12 is passed through and fed by a pair of pinching rollers 14, which are driven at a predetermined speed by a suitable drive means, though not shown. The tubular wrapping member 12 fed by the pinching rollers 14 is initially cut by cutting means 16 at a desired length depending on the height of the container to be encapsulated. Subsequently, the tubular wrapping sheet or member 12 is expanded or dilated into a substantially cylindrical shape by a suitable suction unit 18. The suction unit 18 is arranged to be vertically movable at a desired speed and provide a suction during lowering stroke but not during raising stroke. The dilated wrapping member 12 is delivered downward by the suction unit 18 to a position shown in phantom line in FIG. 1 to feed the tubular wrapping member 12 onto one end of a free or floating guide member 20 which is axially movable.

The guide member 20 has a tapered section 22, a first guide shaft 24, a second guide shaft 26 and an annular recess 28 formed between the first and second shafts 24 and 26 and having a V-shape in cross section. As shown, the first and second guide shafts 24 and 26 are slightly tapered toward their lower portions, respectively.

A pair of longitudinally extending recesses 30 are formed on the tapered section 22 and the first guide shaft 24 and extend toward the annular recess 28. A pair of longitudinally extending recesses 32 are also formed on the second guide shaft 26 and extend toward the annular recess 28. The longitudinal recesses 30 and 32 are axially aligned with each other for a reason as will be described in detail hereinafter. Indicated at 34 is a projection formed on the bottom end of the second guide shaft 26 and adapted to be fitted into an indent 36a of a cap or end closure member 36 of the container 38. It should be noted that the lower end of the second guide shaft 26 is substantially equal to or slightly larger in diameter than the cap 36 of the container 38 to facilitate the delivering of the wrapping member 12 onto the container 38.

The apparatus also includes gripping means comprising chucks 40 which are radially movable toward and away from the axis of the guide member 20. The chucks 40 are formed with angle walls 40a, respectively, and arranged to be movable on a plane perpendicular to the axis of the guide member 20 and slightly above the central portion of the annular recess 28 so that when the chucks 40 are moved toward the axis of the guide member 20 and engage with the walls of the annular recess 28, the guide member 20 is lifted upward for a given distance.

Each of the chucks 40 has a radially extending plunger 42 integrally formed therewith, which is slidably accomodated in a radially extending casing 44. The plunger 42 has formed therein a lateral slot 46 through which a pin 48 extends. The chucks thus arranged are actuated by actuating means 50.

The actuating means 50 is comprised of a pair of levers 52, which are pivotally supported as at 54. The levers 52 are formed with elongated slots 56 with which pins 48 engage for radially moving the plungers 42 of the chucks 40. As best shown in FIG. 3, the levers 52 engage at the other ends thereof with eccentric cams 58 fixed to vertical shafts 59 to which gears 60 meshing with each other are also fixed. The vertical shafts 59 are driven by a suitable driving power source (not shown). Indicated by reference numeral 63 is an urging means such as a tension spring provided between the levers 52 for urging the other ends of the levers 52 toward each other so that the other ends of the levers 52 are maintained to be in constant engagement with the eccentric cams 58 rotatable on the vertical shafts 59.

With the arrangement mentioned above, when both of the levers 52 engage with lower portions of the eccentric cams 58 as shown in FIG. 3, the ends of the levers 52 are moved away from the axis of the guide member 20 by the action of the tension spring 63 and, accordingly, the chucks 40 disengage from the annular recess 28 of the guide member 20. When, however, the other end of the levers engage with higher portions of the eccentric cams 58, the ends of the levers 52 are moved toward the axis of the guide member 20 so that the chucks 40 are brought into engagement with the annular recess 28 of the guide member 20 whereby the guide member 20 is slightly lifted upward as viewed in FIG. 1.

As shown in FIGS. 2 and 3, the apparatus further includes an axially movable engaging means comprising a pair of engaging members 62 each having a plurality of pawls 62a, 62b and 62c adapted to engage with the upper edges of the respective wrapping members 12a fed onto the guide member 20. The engaging members 62 are radially movable toward and away from the axis of the guide member 20 by an actuating means similar to the actuating means 50. It will be noted that, when the engaging members 62 are held in a position shown in FIG. 2, the pawls 62b and 62c are held in engagement with the longitudinal recesses 30 and 32 and movable therealong.

The actuating means 64 comprises a pair of levers 66 connected at their one end to the engaging members 62, respectively, and pivotally supported as at 68. The levers 66 are held in engagement at their other ends with eccentric cams 70 fixed to vertical shafts 72 to which gears 74 meshing with each other are also fixed. The vertical shafts 72 may be connected to and driven by a suitable driving power source (not shown). An urging means such as a tension spring 76 is provided between the levers 66 for urging the levers 66 toward each other so that the other ends of the levers 66 are held in engagement with the eccentric cams 70. The actuating means 64 thus arranged serves to move the engaging members 62 toward and away from the axis of the guide member 20 whereby the pawls of the engaging members 62 are caused to engage with the disengage from the longitudinal recesses 30 and 32.

It should be noted that the engaging means 62 is movable for a predetermined distance along the axis of the guide member 20 from a position shown by a solid line to a position shown by a phantom line in FIG. 2 by any known suitable actuating mechanism using chain, timing belt, etc.

In operation, the gears 60 of the actuating means 50 are rotated so that the lobes of the eccentric cams 58 will cause the levers 52 to move the plungers 42 and the chucks 40 toward the axis of the guide member 20 until the chucks 40 engage with the annular recess 28 of the guide member 20 by which the same is lifted upward.

At the next stage, the tubular wrapping member 12 is cut at a predetermined length by the cutting means 16. The tubular wrapping member 12 thus cut is thereafter expanded or dilated by the action of the suction unit 18, which is moved along the axis of the guide member 20 to a position shown by a phantom line in FIG. 1 whereby the tubular wrapping member portion 12a is put on the tapered section 22 of the guide member 20. Thereafter, the supply of vacuum to the suction unit 18 is stopped and the suction unit 18 is moved away from the tapered section 22 of the guide member 20 along the axis thereof to the initial position. Thus, the tubular wrapping member portion 12a is placed on the tapered section 22 of the guide member 20.

In the meantime, the container 38 is transferred to a position below the bottom wall of the guide member 20 by some suitable conveyor means such as a conveyor belt (not shown). Subsequently, the chucks 40 are caused to disengage from the annular recess 28 of the guide member 20 by the actuating means 50 so that the guide member 20 is lowered until the bottom end thereof abuts against the cap 36 of the container 38. Concurrently, the engaging members 62 which are maintained at their first or upper positions are moved toward the axis of the guide member 20 by the actuating means 64, so that the pawls 62b and 62c engage with the longitudinal recess 30 and 32. Under these circumstances, the guide member 20 is vertically supported by the engaging members 62.

Next, the engaging members 62 are moved along the axis of the guide member 20 toward its second position, viz., lower position shown by a phantom line in FIG. 2 while feeding the tubular wrapping member 12a downward. Then, the engaging members 62 are radially moved away from the axis of the guide member 20 to cause the fingers or pawls 62a, 62b and 62c to disengage from the longitudinal recessed 30 and 32 and, thereafter, the engaging members 62 are moved upward to their first positions. Thus, the radial and axial movements of the engaging members 62 are recycled to feed the tubular wrapping member portion 12a onto the container 38. The wrapping member portion 12a placed on the container 38 may be subjected to a temperature sufficient to cause shrinking of the wrapping member 12a whereby the wrapping member 12a becomes closely fitted over the entire surfaces of the container 38.

It will be appreciated that every time the wrapping member portion 12a is put on the container, the chucks 40 are caused to engage with the annular recess 28 of the guide member 20 to lift up the guide member 20 by which the encapsulated container 38 can be transferred to another position for next processing.

It will now be understood from the foregoing description that in accordance with the present invention a tubular wrapping member can be fed at high speed whereby a container can be encapsulated at high speed in reliable manner.

While, in the illustrated embodiment, the apparatus is shown and described as having a pair of chucks 40 and a pair of engaging members 62 each having three pawls 61a, 62b and 62c, it should be noted that more than one pair of chucks 40 may be provided and the number of pawls of each of the engaging members 62 may be changed. In stead of moving the guide member 20, further, the container 38 may be arranged to be vertically movable relative to the bottom end of the guide member 20.

Furthermore, the guide member 20 may be hollow and formed with a plurality of perforations through which compressed air can be ejected toward outer periphery of the guide member 20 to facilitate the feeding of the tubular wrapping member onto the container.

What is claimed is:

1. A method of encapsulating a container with a tubular wrapping member comprising the steps of:

a. concentrically aligning an elongate guide member with a container to be encapsulated to position one end of the guide member proximate to the container;
b. feeding a substantially continuous tubular wrapping member towards the guide member;
c. cutting the tubular wrapping member into substantially equal portions having predetermined lengths;
d. placing said wrapping member portions successively onto the other end of said guide member; and
e. advancing said wrapping member portions along said guide member towards said one end by engaging the trailing edges of said wrapping member portions and pushing the same until said wrapping member portions are transferred onto successive containers which have been brought into alignment with said guide member.

2. A method as defined in claim 1, wherein said guide member is axially displaceable to facilitate containers to be moved into and out of concentric alignment with said guide member, and further comprising the steps of holding said guide member stationary and axially spaced from a container during the step of placing said wrapping member portions onto said guide member; and axially releasing said guide member to permit the same to move to a position axially proximate to a container during said step of advancing said wrapping member portions.

3. A method as defined in claim 1, wherein said tubular wrapping member is initially substantially flat in nature, and further comprising the step of expanding said tubular wrapping member portions into a substantially cylindrical shape prior to the step of placing said wrapping member portions onto said guide member.

4. A method as defined in claim 1, wherein said guide member is provided on its external surface with at least one axial recess or groove, and wherein said step of advancing said wrapping member portions comprises the step of inserting a pawl of an engaging member into said recess at said trailing edges of said wrapping member portions to permit axial pushing of the same along said guide member.

5. An apparatus for encapsulating a container with a tubular wrapping member comprising:
a. a generally elongate guide member adapted to be concentrically aligned with a container to bring one end of said guide member proximate to the container;
b. feeding means for feeding a substantially continuous tubular wrapping member towards said guide member;
c. cutting means for cutting the tubular wrapping member into substantially equal portions having predetermined lengths;
d. placing means for placing said wrapping member portions successively onto the other end of said guide member; and
e. advancing means for advancing said wrapping member portions along said guide member towards said one end by engaging the trailing edges of said wrapping member portions and pushing the same until said wrapping member portions are transferred onto successive containers which have been brought into alignment with said guide member.

6. An apparatus as defined in claim 5, wherein said guide member has at least one axially extending longitudinal recess, and wherein said advancing means comprises an axially movable engaging means in the nature of fingers or pawls receivable within said longitudinal recess and movable from said other to said one end of said guide member.

7. An apparatus as defined in claim 5, wherein said guide member is provided with an annular recess, and further comprising gripping means for gripping said guide member by being at least partially received within and engaging said annular recess of said guide member, whereby said guide member can be held stationary during the step of placing said wrapping member portions onto said guide member, and said guide member can be released to permit the same to move axially from a position spaced from a respective container to a position proximate thereto prior to the step of advancing said wrapping member portions.

8. An apparatus as defined in claim 7, wherein said gripping means includes means for radially moving said gripping means toward and away from the axis of said guide member.

9. An apparatus as defined in claim 8, wherein said gripping means is located at a position which causes the same to engage said annular recess of said guide member and axially shift the same upwardly upon engagement to move said guide member to a spaced position with respect to a concentrically aligned container.

10. An apparatus as defined in claim 5, wherein said placing means includes means for expanding the tubular wrapping member into a substantially cylindrical shape, said expanding means being movable along the length direction of said guide member to thereby move said wrapping member portions from said cutting means to said guide member.

* * * * *